Patented Nov. 15, 1938

2,137,170

UNITED STATES PATENT OFFICE 2,137,170

DECORATIVE SPANGLE

Harold Alvin Levey, New Orleans, La.

No Drawing. Application June 26, 1936,
Serial No. 87,590

11 Claims. (Cl. 127—29)

The present invention relates to the manufacture of hard flakes or spangles having a water soluble carbohydrate base, said base preferably having film-forming properties.

More specifically, the present invention is directed to flakes or spangles made from a starch base including starch hydrate.

In one form of the invention, the flakes or spangles comprise a mixture of a water soluble carbohydrate, preferably having film-forming properties and a non-carbohydrate material compatible with the water soluble carbohydrate.

In another form of the invention, a mixture of water soluble carbohydrates, at least one of which has film-forming properties, may be utilized to produce flakes or spangles.

In still another form of the invention, the flakes or spangles may be made from carbohydrates which possess no or little film-forming properties, provided there is combined with the latter a material having film-forming properties. This material may be a water-soluble carbohydrate base or a known carbohydrate material.

Any of the flakes produced in accordance with the present invention may be partially or completely coated with a protective coating, which under most circumstances will be a waterproofing coating. The protective coating, as hereinafter set forth, may be applied to the opposing faces of the spangles or flakes to thereby leave the edges of the flakes uncoated, or the flakes may be entirely and completely coated with a protective solution.

The spangles or flakes of the present invention may have incorporated therein a color modifying agent.

In one form of the invention, the water soluble carbohydrate or equivalent material has added thereto an agent functioning to increase the hardness of the final flakes or spangles.

The present invention, in its more limited aspect, is directed to the manufacture of synthetic or artificial scintillating scales or flakes having as an essential constituent thereof a starch base, and more particularly, starch hydrate.

It is desired to point out that in accordance with the present invention any water soluble film-forming carbohydrate may be used, and further that mixtures of water soluble carbohydrates are quite superior to any one of the components used alone. As examples of carbohydrates that may be used, the following are set forth in the order of their scale in the list of carbohydrate products:

Gamma cellulose and water soluble celluloses which result from certain degradation reactions on normal cellulose; the water soluble varieties of regenerated cellulose, all well known in the art; the water soluble varieties of the cellulose derivatives such as the cellulose esters, including the nitrates, acetates, butyrates, benzoates; the starch ethers including methyl, ethyl and benzyl cellulose, as well as the hydroxy ethers of cellulose and the like, all well known in the prior art. There may also be used all the forms of starch products, such as starch hydrates, hydrolyzed starches, dextrinized starches, and the water soluble forms of the starch esters and ethers paralleling those mentioned above for cellulose, all well known in the art. Further, there may be used as the film-form carbohydrate the mono-, di- and tri-saccharoses, the pentosans, and the pentosan gums, as for example, gum arabic. The carbohydrates are classified in Hackh's Chemical Dictionary, pages 152 and 153, copyright 1929, B. Blakiston & Co., Inc., Philadelphia, U. S. A. It may be stated that any of the water soluble carbohydrates therein set forth may be utilized in accordance with the present invention. Mixtures of the products above set forth and equivalent products are in many cases superior to the use of any one used alone.

Many of the crystallizable sugars do not form self-sustaining films, that is, continuous films, and, therefore, in order to utilize these products in accordance with the present invention, there is added limited amounts of carbohydrates which possess film-forming properties. For example, there may be added to any of the crystallizable sugars which it is desired to use, the pentosan gums, as for example, gum arabic, or various starch derivatives may be added, such as starch hydrate, dextrine, starch nitrate, starch acetate or any of the starch ethers which have film-forming properties.

In accordance with the present invention, all the starch degradation products may be used alone or in admixture with other water soluble carbohydrates to produce hard flakes or spangles. Starch esters and ethers of the water soluble types may be used alone or in admixture with other water soluble carbohydrates.

In the specific form of the invention, the water soluble carbohydrates which have film-forming properties may have mixed therewith various water soluble resins. If the water soluble resins have film-forming properties it will not be necessary for the addition product, such as the water soluble carbohydrate, to have film-forming properties. The point which it is desired to bring out is that either the carbohydrate or the addition product must have film-forming properties so that a continuous film can be formed which is adapted to be cast and broken up into spangles.

Examples of suitable water soluble resins which may be added to the carbohydrate products are the formaldehyde ureas, the methylal ureas, and the thio-ureas of the same compounds, and the water soluble esters of polyhydric alcohols and polybasic acids such as for example the water soluble glyceryl phthalates, sucrose tartrates, and related products of this type. While, preferably, the water soluble resins and the compounds above set forth are added to the carbohydrate base, these materials may be utilized by themselves. For example, the water soluble resins may be used to form flakes or spangles.

Further, in accordance with the present invention, the carbohydrates may have added thereto the polyhydric alcohols. Where the amount of polyhydric alcohol present amounts to more than fifty per cent (50%) of the weight of the dried film, said film may be utilized in accordance with the invention herein set forth. Most of these polyhydric alcohols, such as mannitol, sorbitol, dulcitol, and the like, while not useful by themselves for the purposes of the present invention, can be made useful by the addition of about twenty-five per cent (25%) of their weight of a material which has film-forming properties, and particularly by the addition of about twenty-five per cent (25%) of a starch degradation product, such as starch hydrate.

The present invention will be illustrated by a complete example of the production of spangles from a carbohydrate material. When the carbohydrate material is starch, the product is produced from any of the cereal or root starches. The starch may be cooked with water, cast upon a smooth hard surface, dried, and scraped off. Examples of suitable starches are those derived from corn, potato, sago, arrow root, rise, cassava and the like. The use of cassava starch is highly desirable, as this produces the toughest and strongest spangles or flakes, and, of course, spangles or flakes having suitable toughness and strength are highly desirable.

The spangles may be made by mixing ten (10) parts of starch, preferably cassava starch, with eighty (80) parts of water by weight, in which is dissolved a suitable hardness-increasing agent, for example, one-tenth ($\frac{1}{10}$) part by weight of sodium perborate. The above mixture is heated in a water bath, preferably with continual stirring, to cause the granules of starch to swell, to disintegrate to produce a gelatinous mass. The temperature is raised slightly in order to clarify the starch gel. The batch is allowed to stand for a suitable length of time, for example, one (1) hour, while the temperature is kept around 200° F. Thereafter, the plastic is ready for casting. The viscous solution resulting from the above treatment may be spread in films of any desired thickness, as for example, from three ten thousands ($\frac{3}{10000}$) of an inch to six thousands ($\frac{6}{1000}$) of an inch, or more as is desired, the spreading operation being performed by known film-forming methods, including pouring, dipping, spraying, brush application, and printing upon rolls and the like.

The thickness of the film may be gauged by a doctor blade, a film-forming blade, by gauges between two plates, by the viscosity of the solution, by regulating the solids-content of the solution, and by other means well known to the art.

The starch solution may be spread upon a wide variety of surfaces, both organic and inorganic, solids and liquids. The liquids necessarily must not be solvents for the starch.

While clean glass plates form the preferred casting surfaces, other surfaces, such as nickel, stainless steel, aluminum, polished Bakelite, rubber and the like may be used. The carrier surface of the film of water soluble carbohydrate, such as starch, is dried in an oven at about 200° for about twenty (20) minutes for the thicker films. If lower temperatures are used for drying, the drying period is correspondingly longer. The temperature of drying may vary greatly so long as the temperature does not burn or damage the film, or prevent the ultimate production of hard flakes. It may be stated that the time of drying varies with the thickness of the film, the temperature and relative humidity of the drying air, the velocity with which the air passes over the drying sheet, the amount of water evaporated from the sheet, and the tendency of the starch hydrate film to oxidize or "skin over". In general, the time of drying may vary from two and three-quarters (2¾) minutes to more than an hour.

On drying, the film breaks into small shiny scales which may be brushed off of the drying surface. Obviously, the drying operations may be carried out to produce a fairly dry film, which is later on broken up into the desired flakes or spangles. The starch paste is, preferably, spread on the casting surface while hot, namely, around a temperature of 160° F. When glass plates are used, these frequently become pitted. When this condition prevails, the casting surface is abandoned, and a new one substituted therefor. It is highly desirable to cast upon a hard highly polished and smooth surface, as it is the surface of the casting medium which is reproduced upon the contacting surface of the film or the spangles when the latter are removed from the casting surface. It is to be noted that proceeding in accordance with the present invention, hard flakes of material are produced and not soft flexible ones. In other words, it is not necessary to have any plasticizing agent, such as glycerol or the like present. It is preferred that the flakes be brittle to some extent, but essentially hard.

It is desired to point out that the film is dried to a minimum moisture content, and then dusted or scraped off as small flakes. Preferably, the film is dried so that its moisture content is reduced to around four (4) to six per cent (6%) based on the weight of the dried film. These percentages of moisture are not to be taken as an exact limitation. Obviously, they can be considerably varied and still come within the spirit of the present invention. What is desired is that the film is dried so that it may be dusted or scraped off as small flakes. If the film had a greater moisture content, for example, between twelve per cent (12%) and twenty per cent (20%), the film could be removed as such, and would be a continuous self-sustaining film, provided it was of the proper thickness. By carrying the moisture content to a lower figure, the film loses its self-sustaining properties and becomes capable of being dusted off or subjected to a scraping action to produce flakes or spangles. With a low moisture content, the material may be dusted off with a whisk broom to produce the desired flakes or spangles. The removal of the flakes or spangles is due to the high shrinkage coefficient in the two dimensions of the spreading surface, that is, width and length, and is not directly concerned with the thickness of the film shrinkage.

The water soluble carbohydrate material has preferably incorporated therein an agent acting to increase the hardness of the final flakes. Various hardness-increasing agents may be used, as for example, sodium perborate, potassium chlorate, sodium hypochlorite, these being examples of oxidizing agents. Acids, bases and other salts may be used, as well as hydrolytic enzymes, such as amylase, diastase and the like. If desired, fair results may be produced from the standpoint of hardness by merely cooking the starches without any addition product at the temperature required for the bursting of the granules, continuing the heating at the necessary temperature required to clarify the solution, effecting the desired degree of hydration of the starch, and spreading the plastic into film form, as above described.

When the flakes or spangles are to be subjected to very humid conditions, it is desirable to add a preservative to the plastic solution to inhibit organic disintegration and decay of the starch film. Any material may be used either organic or inorganic which will so function. Examples thereof are borax, sodium benzoate, sodium salicylate, sodium ortho-phenol-phenate, beta naphthol, thymol, and the like. These compounds are set forth by way of example and not limitation. The amount of preservative added will depend on a number of factors including the character of the starch and the kind of preservative agent used. When using a preservative agent, such as sodium benzoate or sodium salicylate, it is desirable to add about three-tenths ($\frac{3}{10}$) of one per cent (1%) based on the weight of the dry starch.

About one and one-half per cent (1½%) of borax will give good results.

When using sodium ortho-phenol-phenate, about 0.05% gives good results.

Any preservative which will inhibit the decay of organic matter, retard the growth of mold, fungi, bacteria and protozoa will maintain the utility and value of the starch film. Most all of the inorganic salts possess varying degrees of effectiveness in this role, and most of the aromatic organic compounds may be introduced into the starch hydrate mass as a water solution, or if these or any other compounds are not soluble in water, soluble derivatives may be formed and these introduced into the mass. For example, the aromatic hydrocarbons and their derivatives may be sulphonated, or some other treatment effected to bring the insoluble compound into the soluble form. Further, the insoluble compounds may be introduced in the form of an emulsion. Additional examples of the preservatives are the water soluble inorganic salts of such metals as copper, arsenic, mercury, thallium, antimony, and the like. Other effective inorganic agents inhibiting decay are substantially all of the aromatic alcohols and all of the terpene alcohols, of which cresol, resorcinol, thymol, are representative, and are mentioned merely as representative of the aromatic alcohols; and pineol and borneol, which are representative of the terpene alcohols and are mentioned merely as representative of the terpene alcohols.

In general, it may be stated that the amount of preservative agent will vary in accordance with the acidity of the preservative agent and somewhat in general with the material treated, that is, whether the basic material is starch, starch hydrate, dextrine or other water soluble corbohydrates.

Various sizes of spangles may be produced by scoring the surface upon which the starch plastic is spread prior to brushing or scraping the plastic film from the spreading surface. Further, the spangles may be reduced in size from their original size, and then screened in order to produce various size spangles, and particular flake products in which each product is characterized by uniformity of size. It may be pointed out that even impalpable dusts show an iridescence provided the starch gel is spread upon a clean highly polished surface and thoroughly dried at approximately 200° F.

The spangles or flakes produced in accordance with the above are substantially clear, colorless, substantially water-white scales. In one form of the invention, a dye stuff, preferably a water soluble dye stuff, is added to the starch gel either before or after the cooking operation. This produces clear, colored or tinted spangles which may be mixed with each other in varying amounts to produce spectacular results. For example, to one batch, a water soluble red dye may be added; to another batch a water soluble blue dye may be added; and the third batch may be devoid of a coloring agent. The red, white and blue spangles may be mixed. Other mixtures will suggest themselves to workers in the art. The broad idea is to introduce a color modifying agent or component into the starch flakes, and this may be done in various ways and with various coloring materials. This aspect of the invention is not limited to the use of a water soluble dye stuff. The dye stuff may be dispersed in the starch in various ways.

More specifically, the water soluble carbohydrates having film-forming properties or mixtures of such carbohydrates, or a mixture of such a carbohydrate and an addition agent, such as water soluble resins, or their equivalents, or mixtures of carbohydrates which do not have film-forming properties, with addition agents which confer film-forming properties upon the mixture, may have incorporated therein any suitable dye, and preferably water soluble dyes of the acid or basic types, as well as of the direct dyes. Methylene blue and methyl violet are representative water soluble dyes for producing these tints. The water soluble basic dyes, however, are far more effective than the other types in view of their definite affinity for the water soluble carbohydrate products of the present invention.

The amount of dye required varies with the intensity of the color required, the tintorial strength of the dye and the thickness of the film. The amount of dye added may, in general, vary from 0.2% to 2% based on the weight of the dry starch. It is preferable to add a water solution of the dye to the starch plastic before the latter is spread into film form.

Another modification of the invention is the introduction of pigments, such as used in paints, to the starch plastic prior to casting, to thereby produce opaque deep colored flakes with excellent hiding power and opacity. The pigments used may be zinc oxide, basic lead carbonate, zinc sulfide, green chromic oxide, yellow lead chromate, ferric oxide, Venetian red, the ochres, the siennas, the umbers, both raw and burnt, cobalt blue, Prussian blue, and the like, as well as lamp black, carbon black, and the like. It is desired to point out that a very novel and striking effect is produced by incorporating into the pigments of the present invention semi-transparent pigments which have been, preferably, finely ground, and particularly the colored silicate glasses.

Another effect may be produced by the addition of metal powders to the white spangles, or to the clear, colored or tinted spangles produced, for example by using a water soluble dye as above set forth. These powders may also be added to the opaque decolored flakes by the use of pigments such as used in paints. Aluminum powders and gold bronze powders are examples of suitable powders.

Very small amounts, as for example 0.5% to 3% of synthetic and natural "pearl essence" may be added to the starch gel prior to casting, thereby producing a new form of "pearl essence" which is capable of extending the effect of very small amounts of the natural "pearl essence". Pearl essence which is used, may be fish scale which is chemically composed of guanin, as well as the synthetic forms of pearl essence including crystals of such various inorganic compounds, such as barium, thio-sulphate of small particle size, together with very finely ground mica, talc, carborundum, or the like. This will produce the desired iridescence.

The particles of the above material, said particles being, preferably, dispersed in a water dispersion, may be mixed with the starch plastic in amounts varying between two per cent (2%) and fifteen per cent (15%), but preferably from two per cent (2%) to ten per cent (10%), taken on the weight of the dry starch. It is desirable to make certain that all the particles of the pearl essence are thoroughly wetted and incorporated with the starch plastic, which is then freed from air bubbles by means of mechanical agitation while being subjected to a vacuum. The novelty involved in this product includes the iridescence produced by the flakes or spangles, which is different from that of a continuous film carrying pearl essence. In the flakes, the light strikes the various facelets at different angles, producing scintillations distinctly different from that of a smooth flat continuous surface.

Novel effects may also be attained by dusting dry pearl essence, either natural or artificial, on a formed starch film, while the latter is still wet. One per cent (1%) to three per cent (3%) of the pearl essence, based on the weight of the starch is usually sufficient for this kind of product. Further, the water soluble carbohydrate film produced from any of the materials herein set forth may have applied thereto a coating which carries the pearl essence. When producing spangles, as stated, the moisture content is reduced to four per cent (4%) to six per cent (6%) and later on the coating material is applied thereto. In one form of the present invention, the coating material which may be a waterproofing material, may also carry a decorative material, such as pearl essence, particles of pigments, or particles of silicate glass, or the like. If a self-sustaining film is produced, the procedure herein set forth is applicable to the production of a self-sustaining film, with the exception that when a self-sustaining film is desired, the moisture content is only reduced to from twelve per cent (12%) to twenty per cent (20%) and the film may have applied thereto a waterproofing coating carrying a decorative component.

Flakes produced in accordance with the present invention may be suspended in any vehicle to produce an iridescent lacquer provided the vehicle is not a solvent for the water soluble carbohydrate, as for example, starch, does not contain such a solvent, as for example, water, glycerol or the like. The spangles may be mixed with the various lacquer vehicles such as the cellulose solutions, the resin solutions, clear rubber solutions, as well as the paler clear oleo resinous varnishes to thereby produce a waterproof iridescent coating composition.

For various types of decorative work, for theatrical displays, interior show windows, display signs and the like, an attractive and ornamental value of the herein described product may be achieved by coating a surface with any type of adhesive, such as glue solutions, lacquers and the like, as well as non-drying adhesives, and then dusting the herein described spangles over the surface, producing letters, designs and other configurations where the flakes adhere.

The flakes may be rendered highly water resistant by preparing a self sustaining film of starch in accordance with the disclosure of my Patent No. 2,012,344, by eliminating the use of a plasticizing agent and drying out all included moisture from the base film of the starch prior to coating the same with waterproofing compounds, such as the cellulose solutions referred to in the patent. The film may be then cut or shredded into very small flakes, which are coated on one or each of its faces with a waterproofing compound. While the edges are exposed, the flakes are mechanically sustained by the protective values of their coated faces which bear a large ratio to the small amount of surface exposed by the edges. In addition, the sheen of these types of flakes is greater than the uncoated and the scintillations or iridescence are more marked.

The flakes or spangles herein referred to may be used for window and theatrical decorative effects and for Christmas tree ornamentations, or snow scenes, and when more finely divided they may be used as a pigmenting agent in transparent lacquers and coating compositions to produce the effect of "pearl essence" and fish scale iridescence.

In order to produce the waterproofing coating above referred to, the following compositions may be prepared:

*Table I*

| | Percent |
|---|---|
| Cellulose nitrate (10 sec. viscosity) | 75 |
| Di-butyl phthalate | 25 |
| Total solids | 100 |

The mixture set forth in Table I is dissolved in five unit weights in a solvent mixture of the following composition:

*Table II*

| | Percent |
|---|---|
| Ethyl acetate | 40 |
| Benzol | 30 |
| Methanol | 20 |
| Butyl acetate | 10 |
| Total | 100 |

Another example of a waterproofing material is as follows:

*Table III*

| | Percent |
|---|---|
| Cellulose acetate (5 sec. viscosity) | 75 |
| Ethyl-para-toluene-sulfonamide | 25 |

The mixture set forth in Table III is dissolved in five (5) unit weights of the following solvent mixture to produce the final waterproofing coating material:

| | Percent |
|---|---|
| Acetone | 90 |
| Diacetone alcohol | 10 |

Instead of using a cellulose ester lacquer, the following waterproofing coatings may be prepared and used.

1.
| | Percent |
|---|---|
| Cellulose nitrate | 15 |
| Ethyl acetate | 40 |
| Di-butyl phthalate | 5 |
| Butyl acetate | 20 |
| Benzol | 12 |
| Methanol | 8 |

2. In the above composition, the cellulose nitrate may be substituted by a cellulose ether, including those specifically hereinbefore mentioned.

3.
| | Per cent |
|---|---|
| Natural resins | 25 |
| Butyl acetate | 40 |
| Acetone | 15 |
| Benzol | 12 |
| Methanol | 8 |

The solvent mixture of the above set forth composition may be modified to meet the requirements of the various types of natural resins in order to produce a clear transparent film. It will also serve for most of the synthetic resins.

4.
| | Per cent |
|---|---|
| Rubber solutions (solids) | 10 |
| Ethylene di-chloride | 90 |

Other solvents such as carbon bi-sulphide, acetone, solvent naphtha, etc. may be used in place of the above depending upon the particular form of rubber used in formulating the coating composition.

5.
| | Per cent |
|---|---|
| Waxes | 6–10 |
| Solvents | 94–90 |

The solvents or solvent mixtures will depend upon the particular wax used. For paraffin, solvent naphtha may be used; for halowaxes or chlorinated naphthalenes, ethylene dichloride may be used; for true waxes such as spermaceti, carnauba and the like varying mixtures of acetone, ethyl acetate and the like may be used.

At this point it is desired to state that the term "starch base" includes starch derivatives and starch degradation products. The term "starch derivative" is intended to cover any product which may be obtained from starch as a starting point and which contains in its molecule a more or less modified form of a starch. The term "starch derivative" includes such products as starch esters and starch ethers and dextrines.

Starch hydrate and partially hydrolyzed starch, which is really starch itself, responds to the blue iodine test, which appears to be the criterion to determine the presence of starch. The degradation products which may be completely or partially degraded, do not give the blue iodine test. For example, a degraded product consisting of so-called erythro dextrine gives a red iodine coloration, while totally dextrinized starch gives no color reaction with iodine. Further, on complete hydrolysis by acid treatment or with enzymes or bacterial of the proper type, a theoretically one hundred per cent (100%) yield of dextro glucose should result.

The term "starch hydrate" as used in the present specification, covers the product which results from the heating of the vegetable starches with a substantial amount of water in a nearly neutral solution to the bursting of the granules, and continued heating at substantially the bursting temperature until the plastic mass clarifies. Research work indicates that starch treated as above set forth is the least degraded form of starch. The molecular aggregate is very high and gives the characteristic blue iodine test and almost a theoretical yield of glucose.

It is desired to point out that the present invention, in its preferred form, it directed to the production of hard flakes which are brittle, and by "brittle" it is meant that the flakes will fracture or even shatter with a minimum of bending of each individual flake upon the plane which it occupies. Brittle flakes are preferred in view of the fact that they can be readily crushed by the usual grinding operation. In view of the small size of these flakes, no flexibility is required, and it may be pointed out that any flexure which may be required of a composite film or a composite flake of which the carbohydrate material is one element, will take place in the vehicle or binding material for such flakes.

However, if for any reason, it becomes necessary to produce flakes which are flexible, or even semiflexible, this can be done by incorporating a suitable plasticizer into the plastic carbohydrate. Suitable plasticizers are well known in the art and may comprise a glycerol or a glycol, as for example, ethylene glycol, propylene glycol, di-ethylene glycol and similar polyhydric alcohols.

It has been found that mixtures of polyhydric alcohols and carbohydrates produce a resulting material which is superior to either of the components used alone. As an example of a mixture of a polyhydric alcohol such as mannitol with a carbohydrate such as starch hydrate, there is obtained a product in this case which is harder and flakes more readily than the starch hydrate without the added mannitol. The recommended proportions would be (by weight).

| | Per cent |
|---|---|
| Starch hydrate | 75 |
| Mannitol | 24.6 |
| Sodium perborate | 0.1 |
| Salicylate of soda | 0.3 |

This composition is cooked with 10–12 times its weight of water as described above. It appears to be preferable to add the mannitol and preservative after the starch has been cooked with the sodium perborate.

Similar improved products result from mixtures of the water soluble pentosan gums, such as arabic, tragacanth, karaya or locust bean gum, or the like; anyone of which or combinations of same with starch hydrate produce films of greater strength and improved clarity. One or more of these gums substitute for approximately 25% of the weight of starch hydrate content. These gums are merely dissolved in a portion of the water, and added to the completed starch cook, the resulting plastic already containing the agent which was cooked with the starch, such as the sodium perborate, and the preservative. Other carbohydrates such as the sugars, are added in exactly the same manner as that described above for the gums.

What is claimed is:—

1. Decorative spangles comprising hard shiny flakes of a starch base having self-sustaining film-forming properties.

2. Decorative spangles comprising hard flakes of hydrated starch.

3. Decorative spangles comprising hard flakes of hydrated starch having a color modifying agent distributed therethrough.

4. Decorative spangles comprising hard waterproofed shiny flakes of a hydrated starch said spangles carrying a transparent waterproof film to protect and preserve the shiny surfaces of said flakes.

5. Hard decorative spangles of a mixture of a water soluble carbohydrate devoid of film-forming properties and a starch base compatible with said carbohydrate and adapted to confer film-forming properties on said mixture.

6. Hard decorative spangles of a mixture of a water soluble carbohydrate devoid of film-forming properties and a starch base compatible with said carbohydrate and adapted to confer film-forming properties on said mixture, said spangles carrying a transparent waterproof coating.

7. The process of producing decorative spangles comprising heating a mixture of water, granules of starch and a hardness-increasing agent to a temperature sufficient to cause the granules to swell, burst and form a gelatinous mass, continuing the heating until the latter clarifies, casting said mass, drying to a hard brittle water-white clear mass, and forming spangles therefrom.

8. The process of producing decorative spangles comprising heating a mixture of water, sodium perborate, granules of starch to a temperature sufficient to cause the granules to swell, burst and form a gelatinous mass, continuing the heating until the latter clarifies, casting said mass, drying to a hard brittle water-white clear mass, and forming spangles therefrom.

9. Decorative spangles comprising hard stable shiny flakes of a starch base having a decorative constituent distributed therethrough, said spangles carrying a protective waterproof coating.

10. Decorative spangles consisting predominantly of a water-soluble carbohydrate selected from the following group consisting of gamma cellulose, water-soluble cellulose resulting from degradation reactions on normal celluloses, cellulose esters, cellulose ethers, starch and naturally occurring gums, said spangles having shiny surfaces producing a scintillating effect.

11. Decorative spangles consisting predominantly of a water-soluble carbohydrate selected from the following group consisting of gamma cellulose, water-soluble cellulose resulting from degradation reactions on normal celluloses, cellulose esters, cellulose ethers, starch and naturally occurring gums, said spangles having shiny surfaces producing a scintillating effect, and having a decorative constituent distributed therethrough and carrying a waterproof coating.

HAROLD ALVIN LEVEY.